United States Patent
Caldwell

[15] 3,675,881
[45] July 11, 1972

[54] BUSHING FOR VIBRATION-ISOLATING MOUNTING

[72] Inventor: William F. Caldwell, Portland, Oreg.
[73] Assignee: Huntington Rubber Mills, Portland, Oreg.
[22] Filed: Nov. 4, 1970
[21] Appl. No.: 86,761

[52] U.S. Cl. ..................................248/9, 248/24, 267/153
[51] Int. Cl. ..................................B62d 23/00, B62d 27/04
[58] Field of Search ..................248/15, 9, 24, 358; 267/153; 296/35; 85/70

[56] References Cited

UNITED STATES PATENTS

| | | |
|---|---|---|
| 2,828,095 | 3/1958 | Beck et al. .................................248/91 |
| 3,348,444 | 10/1967 | Brignola .....................................85/70 |
| 2,893,722 | 7/1959 | Beck ........................................267/153 |
| 3,479,081 | 11/1969 | Schaaf ......................................296/35 |

FOREIGN PATENTS OR APPLICATIONS

| 1,260,978 | 12/1961 | France..................................248/358 |
|---|---|---|

*Primary Examiner*—J. Franklin Foss
*Attorney*—Kolisch & Hartwell

[57] ABSTRACT

A bushing-sleeve combination for a vibration-isolating mounting. The bushing is resilient, and the sleeve rigid. The bushing includes an elongated cylindrical body portion having along its entire length a uniform outside diameter. One end of the body portion joins with a radially outwardly projecting flange portion. An elongated axially central bore, which has a substantially uniform diameter along its length, extends through the body and flange portions, and is adapted to have the sleeve slidably mounted therein.

2 Claims, 2 Drawing Figures

PATENTED JUL 11 1972                    3,675,881

INVENTOR.
WILLIAM F. CALDWELL
BY Kolisch & Hartwell
ATTORNEYS

BUSHING FOR VIBRATION-ISOLATING MOUNTING

BACKGROUND AND SUMMARY OF THE INVENTION

This invention pertains to a vibration-isolating mounting of the type employed, as an example, for supporting engines or motors in stationary or propelled equipment. More particularly, it pertains to a novel combination of a resilient bushing and a rigid sleeve employable in such a mounting.

Mountings which isolate and inhibit the transmission of vibrations, and particularly vibrations which are of relatively low frequency and large amplitude, are desirable in many different applications. Preferably, such a mounting comprises a resilient member, interposed between the particular parts that are connected through the mounting, which functions to absorb vibrations that might otherwise be transmitted from one part to the other. In addition, it is desirable that there be employed with such a resilient member, a rigid sleeve received in the member which facilitates proper tightening of the mounting.

It will be apparent that such a resilient member must be strong enough to provide adequate support in a mounting for any static forces therein, and must also be constructed to absorb expected vibrations without suffering damage. It is, therefore, desirable that such a member be configured to present, at substantially all points in a fully assembled mounting, an adequate mass of material to absorb vibrations without becoming overstressed.

A further consideration is that mountings of the type generally indicated are often made up in a production-line fashion, either automatically or by hand. More particularly, the assembling of a mounting typically comprises but one portion of a production-line process. It is, accordingly, desirable that the parts in a mounting, and any resilient member and sleeve employed therein, facilitate easy handling thereof during an assembling procedure.

A general object of the present invention, therefore, is to provide a novel combination of a resilient bushing and a rigid sleeve employable in a vibration-isolating mounting which offers the features and advantages outlined above.

More specifically, an object of the invention is to provide such a combination wherein the bushing is configured to carry adequately all static and dynamic loads which are expected to be transmitted through a mounting of the type outlined.

A further object of the invention is to provide a combination of the type generally indicated wherein the bushing and sleeve are relatively simple in construction, and promote speedy assembly of a mounting.

Still another object of the invention is to provide such a combination which performs in a mounting in a manner greatly minimizing the likelihood of damage due to overstressing in the mounting.

More specifically, an object of the invention is to provide a combination of the type outlined wherein the bushing and sleeve, in an assembled mounting, are relatively movable.

According to a preferred embodiment of the invention, the proposed bushing in the combination comprises an elongated cylindrical body portion having along its entire length a uniform outside diameter. Joined integrally to the body portion at one end thereof is a radially outwardly projecting flange portion. Formed in the body and flange portions is an elongated axially extending central bore which has a substantially uniform diameter. The rigid sleeve in the combination is adapted to fit finger tight in the bore, but is not bonded thereto, and is thus capable of movement in the bore relative to the bushing.

DESCRIPTION OF THE DRAWINGS

Other objects and advantages attained by the invention will become apparent as the description which follows is read in conjunction with the accompanying drawings, wherein.

DETAILED DESCRIPTION OF THE INVENTION

Figure 1:
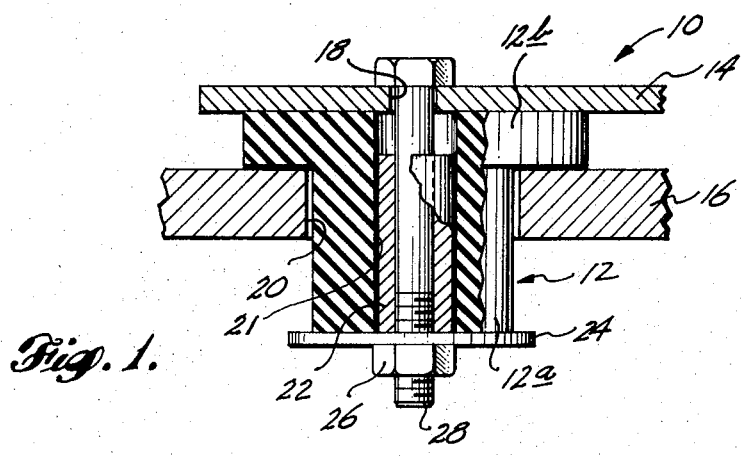
FIG. 1 is a fragmentary side elevation of a mounting employing a bushing and sleeve combination as contemplated herein, with the bushing shown in a substantially nondeformed state in the mounting.

Turning now to the drawings, and referring first to FIG. 1, indicated generally at 10 is a vibration-isolating mounting assembly employing the combination of a bushing 12 and a sleeve 22 constructed according to the invention. The particular mounting assembly shown is for mounting the frame of an engine (a portion of such frame being shown at 14) on a support plate, or web 16. Frame portion 14 includes a bore 18 which, in assembly 10, is axially aligned with a considerably larger bore 20 in plate 16. It should be noted that assembly 10 in FIG. 1 is shown in what might be thought of as a loosened condition, with bushing 12 in a substantially nondeformed state (except to the extent that it carries part of the weight of the motor).

The bushing includes an elongated cylindrical body portion 12a formed integrally with an outwardly projecting flange portion 12b. Flange portion 12b joins with body portion 12a adjacent the top end of the latter in FIG. 1. The bushing is made of a suitable resilient and deformable material such as rubber. Extending axially and centrally through portions 12a, 12b is an elongated cylindrical bore 21. It will be noted that the outside diameter of body portion 12a and the inside diameter of bore 21, are substantially uniform along their entire respective lengths. It will be noted further that the cross-sectional proportions of the body and flange portions are relatively massive. This is an important feature in assuring that the bushing will adequately carry all expected loads transmitted through assembly 10. Vertical loads are carried by flange portion 12b. Sideways loads are carried by body portion 12a. No appreciable discontinuities exist in either portion which might create a weak region in the bushing.

As can be seen, the body portion of the bushing extends freely through bore 20, with the underside of flange portion 12b in the figures seating on the top face of plate 16. Engine frame portion 14 rests on the top of the flange portion.

Slidably received within bore 21 is previously mentioned sleeve 22 which is formed of any suitable rigid material, such as steel. Preferably, sleeve 22 has an outside diameter permitting it to be received finger-tight in the bore. More specifically, it is desirable that the sleeve be capable of being pressed readily by hand into the bore, but not be so loose therein that it tends to fall through the bore. It will be noted that the axial length of the sleeve is less than the axial length of bore 21 with bushing 12 in a substantially nondeformed state as shown in FIG. 1. In the particular loosened mounting assembly shown in FIG. 1, sleeve 22 has been pressed all the way to the base of the bore with its bottom end engaging a washer 24 which is disposed against the bottom of body portion 12a. Holding the washer in place is a nut 26 which is screwed onto the shank of a bolt 28. The bolt shank extends upwardly through the washer, through sleeve 22, and through bore 18 to the usual bolt head which is disposed against the top of engine frame portion 14.

In the making up of assembly 10 to the condition shown therefor in FIG. 1, either by hand or automatically, relatively simple steps are involved. If the bushing and sleeve are supplied the user in a separated condition, the two are readily assembled during the making up of the mounting. Bushing 12 is readily placed on plate 16 in a position such as that shown, and sleeve 22 is easily pushed into bore 21 in the bushing. The sleeve may be pushed to any desired depth in the bore. Frictional engagement between the inside wall of bore 21 and the outside of sleeve 22 prevents the sleeve from slipping inadvertently out of the bore. The washer, nut and bolt are then easily added.

In the case where the user is supplied the bushing-sleeve combination in assembled form, i.e., with the sleeve already inserted in the bushing, it will be apparent that substantially the same steps as those just described are followed, except that the user is not required to perform the step of inserting the sleeve.

Figure 2:
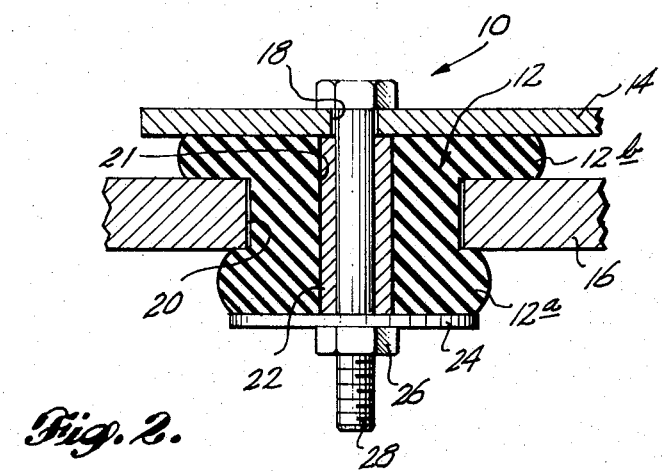
FIG. 2 is a view similar to FIG. 1, but illustrating the bushing in a deformed state in the mounting.

To tighten up the assembly to a condition such as that shown in FIG. 2, nut 26 is simply screwed further onto the shank of bolt 28. More specifically, the nut is adjusted until sleeve 22 becomes tightly clamped between frame portion 14 and washer 24. It will be apparent that during such adjustment of nut 26, sleeve 22 slides in bore 21 to adjust its position therein. It will also be apparent that the sleeve limits the amount of tightening producible in the mounting. The sleeve, therefore, is selected with a suitable axial length to assure proper tightening in the mounting.

Such adjustment results in the bushing deforming between the washer and motor frame portion, whereupon it assumes a cross-sectional configuration such as that shown in FIG. 2. And, it will be observed that in the tightened condition of assembly 10, with bushing 12 deformed, the bushing presents, at substantially all regions between frame portion 14, plate 16, sleeve 22, and washer 24, a substantial mass of material for absorbing vibrations. As the mounting performs in absorbing vibrations, it will be noted that the bushing and sleeve are permitted to slide relative to one another with deformation of the bushing. This action greatly minimizes the chance of any overstressing occurring in the bushing at the interface between it and the sleeve.

The proposed bushing-sleeve combination, in addition to being readily and easily incorporated in a mounting assembly such as that described, and in addition to containing a bushing configured adequately to carry all loads, is obviously relatively simple and inexpensive to construct. As a consequence, the combination may be used economically and reliably in many different applications where vibration-isolation is desired in a mounting.

While an embodiment of the invention has been described herein, it is appreciated that variations and modifications may be made without departing from the spirit of the invention.

It is claimed and desired to secure by letters patent:

1. A bushing-sleeve combination for a vibration-isolating mounting comprising:
   a resilient elastomer bushing which includes, with the bushing in a relaxed state, an elongated cylindrical body portion having a uniform outer diameter along its entire length, one end of said body portion forming one end of said bushing, and a flange portion integral with the body portion radiating outwardly of said body portion at the other end of the body portion opposite the said one end of the body portion which flange portion forms the opposite end of the bushing, said bushing further including with the bushing in a relaxed state a continuous cylindrical surface defining an elongated continuous bore of uniform diameter extending axially the entire length of the bushing, and
   an elongated rigid hollow sleeve of uniform outer diameter with the bushing in a relaxed state, said sleeve defining the axial dimension of said bushing with the bushing compressed between its ends, said sleeve during compression of the bushing providing sliding support for said cylindrical surface as such shortens to attain the length of the sleeve, said sleeve with the bushing compressed and in operative load-supporting condition serving to provide a continuous inner support for said cylindrical surface with outer parts of the bushing deforming radially outwardly progressing from the cylindrical surface defining said bore to accommodate compression of the bushing.

2. In a resilient mounting including a supporting member with a hole extending therethrough and a supported member in spaced relation to the supporting member,
   a compressed bushing including a body portion extending through the hole in said supporting member terminating in an end forming an end of the bushing, and a flange portion integral with the body portion disposed between the supporting and supported members, said flange portion forming the other end of the bushing,
   a continuous cylindrical surface defining a bore of uniform diameter extending axially the entire length of the bushing,
   an elongated, rigid continuous hollow sleeve coextensive in length with the compressed bushing slidably received within and extending through said bore and supporting the continuous surface defining said bore,
   said bushing bulging radially outwardly from said bore at said one end whereby the same is compressed against one side of the supporting member and said flange portion bulging radially outwardly in a region between the supporting and supported members,
   said body portion of said bushing with said bushing in a relaxed state having an elongated cylindrical shape of uniform diameter throughout its length, and said flange portion with the bushing in a relaxed state radiating out from the body portion at said other end of the bushing and said surface defining said bore in the bushing with the bushing in a relaxed state extending as a continuous surface defining an elongated bore of uniform diameter extending the entire length of the bushing,
   said bulging one end of the bushing being formed through compressing of the bushing to shorten it between its ends together with shortening of the length of the bore whereby the bushing is made to have a length coextensive with the sleeve, the bushing on being compressed extruding from the surface defining said bore outwardly from the support rendered by said sleeve, and said bulging flange portion also being formed through compressing of the bushing to shorten it with the bushing extruding at the region of its flange portion outwardly from the support rendered by said sleeve.

* * * * *

UNITED STATES PATENT AND TRADEMARK OFFICE
CERTIFICATE OF CORRECTION

PATENT NO. : 3,675,881
DATED : July 11, 1972
INVENTOR(S) : William F. Caldwell

It is certified that error appears in the above-identified patent and that said Letters Patent are hereby corrected as shown below:

Claim 1, column 3, line 51 after the word "diameter" add

--slidably received in said bore, said sleeve having a length somewhat less than the length of said bore--

Signed and Sealed this

Eighth Day of February 1977

[SEAL]

Attest:

RUTH C. MASON
*Attesting Officer*

C. MARSHALL DANN
*Commissioner of Patents and Trademarks*